United States Patent [19]
Hoyes et al.

[11] Patent Number: 6,121,360
[45] Date of Patent: Sep. 19, 2000

[54] GASKETS

[75] Inventors: John R. Hoyes, Lancashire; Alan W. Atkinson, Warwickshire; Stephen P. Bond, Warwickshire; Adam M. West, Warwickshire, all of United Kingdom

[73] Assignee: Flexitallic Investments, Inc., Houston, Tex.

[21] Appl. No.: 09/171,111

[22] PCT Filed: Feb. 12, 1998

[86] PCT No.: PCT/GB98/00309

§ 371 Date: Jul. 23, 1999

§ 102(e) Date: Jul. 23, 1999

[30] Foreign Application Priority Data

Feb. 13, 1997 [GB] United Kingdom ............... 97029193
Feb. 13, 1997 [GB] United Kingdom ............... 97029664

[51] Int. Cl.[7] ........................................... C08K 3/00
[52] U.S. Cl. ..................... 524/445; 524/449; 428/447; 428/493; 428/495; 428/517
[58] Field of Search ................... 524/445, 449; 428/447, 493, 495, 517

[56] References Cited

U.S. PATENT DOCUMENTS 4,271,228  6/1981  Foster .
4,477,094 10/1984  Yamamoto .
4,629,199 12/1986  Yamamoto .

FOREIGN PATENT DOCUMENTS

PCT/US92/06733  of 0000  WIPO .
93 04118  3/1993  WIPO .
WO 93/04118  3/1993  WIPO .

*Primary Examiner*—Edward J. Cain
*Attorney, Agent, or Firm*—Dwayne J. Mason; Winstead Schrest & Minick

[57] ABSTRACT

A gasket comprises a sealing layer formed from a resilient material which comprises particles of chemically-exfoliated vermiculite bonded together. The layer also comprises a hydrolysis-resistant polymer coupled to the vermiculite by a coupling agent. A further gasket comprises a sealing strip wound into a spiral. The sealing strip comprises a resilient layer comprising particles of chemically-exfoliated vermiculite. The sealing strip also comprises a flexible carrier strip to which said resilient layer is bonded.

14 Claims, No Drawings

GASKETS

The invention is concerned with gaskets (including spirally wound gaskets), in particular with gaskets having a sealing-enhancing layer which is based on exfoliated vermiculite.

Exfoliated vermiculite is a known heat-resistant resilient material. Exfoliated vermiculite is conventionally formed by expanding mineral vermiculite using gas, this material being referred to herein as "gas-exfoliated vermiculite". The gas may be thermally generated, in which case the product is called "thermally-exfoliated vermiculite" (TEV). TEV may be made by flash-heating mineral vermiculite to 750–1000° C., at which temperature the water (free and combined) in the ore vaporises rapidly and the steam generated forces apart the silicate sheets which form the raw material, so bringing about an expansion of 10–20 times perpendicular to the plane of the sheets. The granules formed have a chemical composition which (apart from the loss of water) is virtually identical to that of the raw material. Gas-exfoliated vermiculite may also be made by treating raw vermiculite with a liquid chemical, eg hydrogen peroxide, that penetrates between the silicate sheets and subsequently evolves a gas, eg oxygen, to bring about exfoliation. A different form of exfoliated vermiculite is known as "chemically-exfoliated vermiculite" (CEV) and is formed by treating the ore and swelling it in water. In one possible preparation method, the ore is treated with saturated sodium chloride solution to exchange magnesium ions for sodium ions, and then with n-butyl ammonium chloride to replace sodium ions with n—$C_4$—$H_9NH_3$ ions. On washing with water swelling takes place. The swollen material is then subjected to high shear to produce an aqueous suspension of very fine (diameter below 50 microns) vermiculite particles.

It is known to utilise exfoliated vermiculite as a layer of a sheet gasket, eg an automotive head gasket, and for other purposes. For example, GB 2 193 953 B discloses forming sheet-like gaskets formed from particles of gas-exfoliated vermiculite. Because such particles do not cohere well, they are bound together by fine particles of CEV. The use of CEV as a binder retains heat resistance and resilience, whereas the use of other binders could result in an incompressible structure. However, although exfoliated vermiculite has excellent heat resistance and a high degree of resilience, it has poor water resistance.

GB 2 123 034 B describes making a flexible sheet material, eg for a gasket, by subjecting an aqueous suspension to electrophoresis. The suspension contains an expanded layer silicate, eg CEV with a particle size below 50 microns, and a dispersed organic polymeric material, eg acrylic polymer, acrylonitrile-butadiene copolymer, epoxy resin, or natural rubber.

A sealing element for a gasket for the exhaust system of an internal combustion engine is disclosed in GB 2 217 742 A. This sealing element comprises relatively coarse particles of TEV (passing a 2 mm sieve) bonded together by fine CEV particles (about 100 microns in size). This element is stated to disintegrate quickly if exposed to water as the fine CEV particles are readily dispersed in water. In order to improve water-resistance, GB 2 217 742 A proposes bringing the element into contact with a solution of an aluminate or a zirconyl salt. Further improvement is achieved by treatment with a solution of a silicone elastomer. An example is given of impregnation of a sheet (which had already been treated with sodium aluminate) by a 15% solution of silicone elastomer in toluene, the solids uptake being 3% by weight.

It is an object of the present invention to provide a gasket comprising a layer of sealing enhancing material which is based on exfoliated vermiculite, the layer having improved water resistance.

The invention provides a gasket comprising a sealing layer formed from a resilient material which comprises particles of chemically-exfoliated vermiculite bonded together, wherein the layer also comprises a hydrolysis-resistant polymer coupled to the vermiculite by a coupling agent.

In a gasket according to the invention, it is found that the layer is more water resistant than a material containing only vermiculite and a coupling agent, and also more water resistant than a material containing only vermiculite and a polymer.

Since CEV is a relatively expensive material compared with gas-exfoliated vermiculite, eg TEV, in a gasket according to the invention, the resilient layer may also comprise particles of gas-exfoliated vermiculite, eg the layer may comprise particles of gas-exfoliated vermiculite bonded together by particles of CEV. The gas-exfoliated vermiculite may be milled to a particle size of less than 50 microns. Other possible additives include talc, mica and unexfoliated vermiculite.

The polymer may be selected from nitrile butadiene rubbers, styrene butadiene rubbers, natural rubber, butyl rubber, siloxanes (particularly organosiloxanes such as dialkyl siloxanes) and ethylene propyldiene monomer. Diene-based polymers are suitable because they are flexible and hyrolysis-resistant.

The coupling agent may be a silane, eg a vinyl functional silane such as triethoxy vinyl silane $(CH_3CH_2O)_3 SiCH=CH_2$).

Said resilient layer may be mechanically bonded to a sheet of the gasket, eg by tangs projecting from the sheet into the layer. The sheet may be of stainless steel, carbon steel, wire mesh or fibre mesh, such as glass fibre mesh.

Spirally wound gaskets are well-known and are formed from a metal supporting strip, conventionally of steel, and a sealing strip formed from a resilient material, conventionally expanded graphite (also called exfoliated graphite). In the formation of conventional spirally wound gaskets, the steel supporting strip is fed onto a mandrel. The steel supporting strip is welded either to itself to form a closed loop around the mandrel or, alternatively, is welded to an inner ring of the gasket which is itself mounted on the mandrel. The mandrel is then rotated to draw further supporting strip on to the mandrel to form a planar spiral. Simultaneously, the sealing strip is drawn between the coils of the steel strip so that a spiral of the sealing strip is formed interposed between the coils of the supporting strip. When the gasket spiral has been completed, the steel supporting strip is welded to itself to form a closed loop at the outside of the gasket and the gasket is removed from the mandrel. Such gaskets are utilised, for example, for forming seals between flanges at the ends of pipes. The supporting strip holds the sealing strip in position and the sealing strip forms a seal between the flanges and between the coils of the supporting strip.

It should be clear, from the above description of how spirally wound gaskets are formed that, the sealing strip thereof must have sufficient strength to enable it to be drawn into the spiral without breakage. A sealing strip formed from expanded graphite foil, although relatively brittle, does have sufficient strength.

In many cases, it is desirable for a spirally wound gasket to have a high degree of heat resistance but, in a conventional gasket, the heat resistance is limited by that of the expanded graphite which is lower than is desirable.

As discussed above, although exfoliated vermiculite has excellent heat resistance and a high degree of resilience, strips formed from exfoliated vermiculite bound with CEV are not suitable for use in spirally wound gaskets because such strips are inherently too brittle to allow formation of the gasket, by the method described above, without serious risk of breakage of the strip.

It is a further object of the present invention to provide a spirally wound gasket in which the sealing strip has increased heat resistance.

According to a further aspect, the invention provides a gasket comprising a sealing strip wound into a spiral, wherein the sealing strip comprises a resilient layer comprising particles of chemically-exfoliated vermiculite, and a flexible carrier strip to which said layer is bonded.

In a gasket according to the invention, the resilient is bonded to the carrier strip, so that, during winding of the gasket, the strength of the strip prevents breakage of the resilient material. This enables a gasket with increased heat resistance to be formed.

The resilient layer may also comprise particles of gas-exfoliated vermiculite, eg the layer may comprise particles of gas-exfoliated vermiculite bonded together by particles of CEV. The particles of gas-exfoliated vermiculite may be milled to a diameter of 50 microns or less. It is also possible for the resilient layer to comprise unexfoliated (intumescent) vermiculite which can, on heating of the gasket, eg in situ, form TEV to swell the resilient layer and, thus improve sealing.

In order to improve the water-resistance of the gasket, the resilient layer may also comprise a hydrolysis-resistant polymer coupled to the vermiculite. Suitable polymers are nitrile butadiene rubbers, styrene butadiene rubbers, natural rubber, butyl rubber, and ethylene propyldiene monomer. Diene-based polymers are suitable because they are flexible and hydrolysis-resistant. Suitable agents for coupling the polymer to the vermiculite are silanes, eg vinyl functional silanes, such as triethoxy vinyl silane $(CH_3CH_2O)_3SiCH=CH_2$).

Said resilient layer and a further resilient layer may be bonded to opposite sides of the carrier strip. This improves sealing by providing seals on both sides of the carrier strip.

The resilient layer may be bonded to the carrier strip by adhesive but it may be advantageous if it is mechanically bonded.

The carrier strip may be made of fabric, paper, glass tissue or plastics material but, for high temperature applications, it is preferred if it is made of metal. Where the gasket also comprises a separate supporting strip so that the carrier strip functions only to enable formation of the gasket without breakage of the resilient layer, the carrier strip is, preferably, a thin metal foil, eg of aluminium, nickel or steel. However, it is also possible for the carrier strip to function also as the supporting strip of the gasket, being made of, eg, stainless steel. The resilient layer may be mechanically bonded to a metal carrier strip by tangs projecting from the carrier strip into the resilient layer. For example, a strip of tanged metal can be brought into overlying relationship with a layer of the resilient material and passed between rollers to press the tangs into the resilient material.

Preferably, a metal carrier strip has end portions which are not bonded to the resilient layer so that these end portions can be welded in the formation of the gasket.

There now follows a detailed description of illustrative examples according to the invention.

A tanged stainless steel sheet was first prepared. This sheet was 100 microns in thickness. The sheet was tanged by perforating it with square holes, each hole being 1.5 mm square and the hole centre-spacing being 3 mm. Half the holes were perforated by passing a tool through the sheet in a first direction and the remaining half, which alternated with the first-mentioned half, were perforated by passing a tool through the sheet in the opposite direction. The edges of the holes, thus, formed tangs projecting from the sheet in opposite directions. The tangs projected by about 1 mm.

In illustrative example 1, an aqueous slurry (15% solids) was obtained containing about 0.741 Kg of CEV particles (the slurry was obtained from Grace Construction Products Limited and is designated "Microlite HTS").

The slurry was approximately 15% solids. To this slurry was added 0.074 Kg of particles of spray-dried CEV having particle size about 45 microns obtained from Grace Construction Products Limited and designated "Microlite Powder". To this, was added 0.185 Kg of Dupre Superfine TEV. This gave a paste having approximately 37% solids. To this paste was added 3.7 g of a coupling agent (a vinyl functional silane called "Silquest A-151" obtainable from OSi Specialities) and further mixing was carried out.

Next, a hydrolyses-resistant polymer/solvent mixture was prepared. This mixture was 50 g of solid nitrile butadiene rubber (Nippon Zeon N36C80), 250 g of toluene, and 3.1 g of a curing agent ("Dicup 40", dicumylperoxide). 111 g of this mixture (ie 18.5 g of rubber) was added to the above-mentioned paste and mixing was carried out. This gave a paste with approximately 5% rubber content.

Next, the paste (including the polymer/solvent mixture) was spread over one side of the metal sheet mentioned above. The sheet was then passed between calendering rollers (using release paper to prevent the paste sticking to the rollers) and was dried. Further paste was then spread over the other side of the metal sheet and the calendering and drying was repeated. The sheet was then pressed to densify the resilient material which formed layers approximately 0.75 mm thick on both sides of the metal. Then it was heated to peroxide cure the rubber.

The completed gasket had two sealing layers formed from a resilient material. The resilient material comprised particles of CEV bonded together, and coupled to the nitrile butadiene rubber by the silane. The gasket was tested to determine its water resistance by boiling in water for 5 hours. The gasket retained its integrity.

In illustrative example 2, an aqueous slurry (15% solids) was obtained containing about 0.471 Kg of CEV particles (the slurry was obtained from Grace Construction Products Limited and is designated "Microlite HTS"). The slurry was approximately 15% solids. To this slurry was added 0.529 Kg of particles of spray-dried CEV having particle size about 45 microns obtained from Grave Construction Products Limited and designated "Microlite Powder". This gave a paste having approximately 60% solids. To this paste was added 6 g of a coupling agent (a vinyl functional silane called "Silquest A-151" obtainable from OSi Specialities) and further mixing was carried out.

Next, a rubber/solvent mixture was prepared. This mixture was 50 g of solid nitrile butadiene rubber (Nippon Zeon N36C80), 250 g of toluene, and 3.1 g of a curing agent ("Dicup 40", dicumylperoxide). 90.9g of this mixture was added to the above-mentioned paste and mixing was carried out. This gave a paste with approximately 2.5% rubber content.

Next, the paste (including the rubber/solvent mixture) was spread over one side of the metal sheet mentioned above. The sheet was then passed between calendering rollers (using release paper to prevent the paste from sticking to the rollers) and was dried. Further paste was then spread over the other side of the metal sheet and the calendering and drying was repeated. The sheet was then pressed to densify the resilient material which formed layers approximately 1.4 mm thick on both sides of the metal. It was then heated to peroxide cure the rubber.

The metal sheet was then slit into strips 7 mm wide on a conventional slitting machine and these strips, thereby forming a metal carrier strip with resilient layers bonded to both sides thereof. The strips were wound into a spiral gasket by a conventional winding machine. The completed gasket had a spiral of stainless steel strip, acting as a supporting strip of the gasket, with two resilient layers between adjacent coils of the steel.

The gasket made according to the illustrative method was heated to 450° C. and held at that temperature for 8 hours. After returning to ambient temperature, the gasket was subjected to a standard pressure test and no leakage was observed.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gasket comprising:
   a sealing strip having a resilient layer with a plurality of chemically-exfoliated vermiculite particles; and
   a flexible carrier strip, said sealing strip bonded to said flexible carrier strip, said sealing strip and said flexible carrier strip oriented in a spiral relation.

2. The gasket of claim 1, wherein said resilient layer further comprises a plurality of gas-exfoliated vermiculite particles.

3. The gasket of claim 1, wherein said resilient layer further comprises a hydrolysis-resistant polymer coupled to said resilient layer.

4. The gasket of claim 2, wherein said resilient layer further comprises a hydrolysis-resistant polymer coupled to sail resilient layer.

5. The gasket of claim 4, wherein said hydrolysis-resistant polymer is selected from the group consisting of nitrile butadiene rubbers, styrene butadiene rubbers, natural rubber, butyl rubber, siloxane, ethylene, and propyldiene monomer.

6. The gasket of claim 3 wherein said polymer is coupled to said resilient layer by a silane.

7. The gasket of claim 4 wherein said polymer is coupled to said resilient layer by a silane.

8. The gasket of claim 1 further comprising a second sealing strip having a resilient layer without a plurality of chemically-exfoliated vermiculite particles and opposingly bonded with respect to said first sealing strip to said carrier strip.

9. The gasket of claim 8, wherein said resilient layer of each of said first and said second sealing strips further comprises a plurality of gas-exfoliated vermiculite particles.

10. The gasket of claim 8, wherein said resilient layer of each of said first and said second sealing strip further comprises a hydrolysis-resistant polymer coupled to said resilient layer.

11. The gasket of claim 9, wherein said resilient layer of each of said first and said second sealing strip further comprises a hydrolysis-resistant polymer coupled to said resilient layer.

12. The gasket of claim 11, wherein said hydrolysis-resistant polymer is selected from the group consisting of nitrile butadiene rubbers, styrene butadiene rubbers, natural rubber, butyl rubber, siloxane, ethylene, and propyldiene monomer.

13. The gasket of claim 10 wherein said polymer is coupled to said resilient layer by a silane.

14. The gasket of claim wherein said polymer is coupled to said resilient layer by a silane.

* * * * *